United States Patent Office 3,584,079
Patented June 8, 1971

3,584,079
VINYL HALIDE POLYMERIC BLENDS
Quirino A. Trementozzi, Springfield, and Massimo Baer, Longmeadow, Mass., assignors to Monsanto Company, St. Louis, Mo.
No Drawing. Filed July 12, 1968, Ser. No. 744,305
Int. Cl. C08f 29/24, 29/56
U.S. Cl. 260—876              2 Claims

ABSTRACT OF THE DISCLOSURE

A polymeric blend is prepared from a vinyl halide polymer and an interpolymer of an N-substituted acrylamide with a relatively nonpolar comonomer. The blends exhibit a superior balance of heat resistance and processability while maintaining or improving other properties, including toughness.

BACKGROUND OF THE INVENTION

Vinyl halide homopolymers and copolymers have attained a position of considerable significance in industrial, military and consumer applications. Although the vinyl halide resins exhibit many desirable properties, the balance of properties therein may not be optimum for various applications or processing techniques. Thus, in some cases certain highly desirable processing characteristics are obtained in a given composition at the sacrifice of physical properties of the final product, and vice versa; these factors tend to limit the applications in which vinyl halide resins are useful.

It has been heretofore observed that certain advantages were obtainable in processing by utilizing blends of different vinyl halide polymers. Such blends exhibited desirable flow properties and good physical properties; however, there has been some sacrifice of the most desirable characteristics of the individual components. It has also been recognized that vinyl halide copolymers may be produced which have heat resistance properties intermediate the values of homopolymers produced from the monomers individually. Such copolymers are often difficult or expensive to produce and generally do not retain all the advantageous properties of the vinyl halide polymers.

Accordingly, it is an object of the present invention to provide novel physical blends of vinyl halide polymers wherein a desirable balance of physical properties and processing characteristics is obtained.

It is also an object to provide novel vinyl halide polymeric blends having outstanding processing characteristics coupled with improved heat resistance.

Another object is to provide improved polyvinyl halide blends in which heat resistance is maintained at least at the level of the vinyl halide polymeric component.

Still another object is to provide novel blends of vinyl halide polymers from which superior molded and extruded products can be produced conveniently and relatively economically.

SUMMARY OF THE INVENTION

It has now been found that the foregoing and related objects may be readily attained in a blend comprising a vinyl halide polymer and a compatible interpolymer in a weight ratio of 1.2–20:1, respectively. About 10–50 weight percent of the interpolymer is an N-substituted acrylamide wherein the substituents are selected from the group consisting of cyclohexyl, phenyl and branched alkyl radicals containing 3–6 carbon atoms. About 50–90 weight percent of the interpolymer is styrene or an alpha-alkyl styrene, and up to 40 weight percent of the interpolymer may be a copolymerizable polar monomer selected from the group consisting of ethylenically unsaturated nitriles, acrylic and methacrylic acid esters and ring halogenated aromatic hydrocarbons.

The solubility parameter of the interpolymer should be tailored to that of the vinyl halide polymer so that the deviation therebetween is no greater than about one unit, and preferably the interpolymer has a glass transition temperature of 120° centigrade or higher.

The blend may include up to 25 weight percent of a preformed rubbery polymer, which may be introduced in an ungrafted state when sufficiently compatible with the vinyl halide polymer. It may also be part of a graft copolymer wherein it serves as a graft substrate for the interpolymer monomers, or as a substrate for the polymerized vinyl halide. The vinyl halide polymer may comprise a homopolymer of a vinyl halide, a copolymer thereof with another ethylenically unsaturated monomer, or a post-halogenated polymerized vinyl halide.

DESCRIPTION OF THE PREFERRED EMBODIMENTS

As indicated, blends of the present invention essentially comprise a vinyl halide polymer and an interpolymer of an N-substituted acrylamide copolymerized at least with a member of the group consisting of styrene, alpha-alkyl styrenes and mixtures thereof. Interpolymers containing other copolymerizable monomers, impact modifiers, inert fillers, stabilizers, plasticizers, pigments, etc., may be incorporated in the blends in addition to the two essential components.

The vinyl halides

The vinyl halides which are suitable for use in the vinyl halide polymer are vinyl chloride and vinyl fluoride; vinyl chloride is the preferred monomer and may be used alone or in combination with vinyl fluoride and/or another ethylenically unsaturated compound copolymerizable therewith. In the case of a copolymer with another ethylenically unsaturated compound, the amount of comonomer generally does not exceed about 25 percent of the weight of the resulting vinyl halide polymer, and preferably the amount of the second component is less than about 15 percent of the product.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic alkyl-acrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; dialkyl esters of maleic acid such as dimethyl maleate, diethyl fumerate, etc., dialkyl esters of fumaric acid such as dimethyl fumarate, diethyl fumarate, etc.; vinyl alkyl ethers and ketones; and various other ethylenically unsaturated compounds copolymerizable with the vinyl halides. Mixtures of compounds exemplified by the foregoing materials may also be used to form the vinyl halide polymer.

A portion of the vinyl halide monomer may be grafted onto a rubbery substrate if so desired by reacting one or a mixture of vinyl halide monomers in the presence of a preformed rubbery polymer. Polyolefins which may be used for this purpose include polyethylene, chlorinated polyethylene, chlorosulfonated polyethylene and similar higher homologs of polyethylene, and ethylene/propylene copolymers, and of considerable value in these blends are interpolymers of the olefins such as ethylene/acrylate and ethylene/vinyl acetate copolymers. Particularly desirable results are obtained when a graft of vinyl chloride upon chlorinated polyethylene or ethylene/vinyl acetate is employed.

Thus, the term "vinyl halide polymer" as used herein includes the graft copolymers as well as the ungrafted vinyl halide homopolymers and copolymers. The term also includes the post-halogenated vinyl halide polymers, such as chlorinated polyvinyl chloride, which derive particular benefit from blending with the interpolymers described in terms of processability. Although the halogenated polymers normally possess very good heat resistance, their high melt viscosities tend to limit the methods by which they may be fabricated, as a practical matter. The present blends effect a significant reduction in melt viscosity while maintaining the beneficial heat resistance and other properties of these polymers.

The method used to prepare the vinyl halide resins may be any which is commonly practiced in the art; the polymerization may be effected en masse, in solution or with the monomer in aqueous dispersion. From the standpoint of economics and process control, highly suitable polymers can be prepared by a method in which the monomer reactants are suspended in water. Other variations upon the polymerization method may also be utilized in order to vary the properties of the product; e.g., highly fluid resins can be prepared by polymerization at relatively high temperatures to produce polymers of low crystallinity, or by continuously feeding the monomer charge or a portion thereof to the reaction vessel.

The interpolymer

The interpolymers which may be blended with the vinyl halide polymers to attain the objects of the invention contain at least 10 and as much as 50 percent by weight of an N-substituted acrylamide. In addition, the interpolymer must contain styrene, an alpha-alkyl styrene or a mixture thereof, and it may optionally contain a relatively polar comonomer and/or a rubbery polymeric substrate. Preferably, the interpolymer has a glass transition temperature of at least 120° centigrade, and most desirably it is 130° or higher.

Although the theory of the invention is not clearly understood, it is believed that the bulky substituents on the acrylamide tend to have an immobilizing and stiffening effect upon the polymeric backbone, which contributes to attaining a relatively high glass transition temperature therein. In addition, relatively strong dipolar interaction and the creation of "pseudo-crosslinks" due to hydrogen bonding are thought also to contribute to this effect in the interpolymer. If the solubility parameter[1] of the interpolymer is quite closely matched with that of the vinyl halide polymer, the high glass transition temperature of the interpolymer appears to effect a rise in that of the vinyl halide polymer. This produces a blend which is more heat resistant and at the same time more processable, in which there is no sacrifice of, and sometimes there are improvements in, other physical properties. To achieve this effect, it has been found that the deviation between the solubility parameters of the vinyl halide polymer and the interpolymer should not exceed about one unit, and preferably the deviation should be not more than 0.6 unit.

The acrylamides which are suitable for use in the present interpolymers are N-mono- or N-di-substituted with relatively bulky groups. The substituents may be cyclohexyl, phenyl or alkyl radicals which are branched and contain 3 to 6 carbon atoms, e.g., isopropyl, isobutyl, tertiary butyl, isopentyl, neopentyl, etc. Thus, suitable acrylamides are exemplified by N-isopropyl acrylamide, N-tertiary butyl acrylamide, N-cyclohexyl acrylamide, N-phenyl acrylamide, N,N'-ditertiary butyl acrylamide, N, N'-diphenyl acrylamide, etc.; however, the mono-substituted compounds, and particularly N-t-butyl acrylamide, are preferred. Alkyl substituents containing more than 6 or less than 2 carbon atoms are unsuitable because they do not normally provide the requisite high glass transition temperatures. The phenyl radical may have ring substitutions if so desired.

In order to balance the solubility parameter for advantageous blending with the vinyl halide polymers, it is necessary that the interpolymer contain about 50–90 percent by weight of styrene, an alpha-alkyl styrene (such as preferably alpha-methyl styrene) or a mixture thereof. The relative amounts of the acrylamide and the styrene constituent depends upon the specific compounds employed and the solubility parameter of the particular vinyl halide polymer which is to be matched. The specific proportions also depend upon the presence of other components in the interpolymer, such as a relatively polar monomer or mixtures thereof, which will normally affect the interpolymer solubility parameter. In any event, the maximum amount of this constituent which is consistent with matching of the solubility parameters provides the best processing characteristics to the blend. Processability is also enhanced by maintaining as low a molecular weight in the interpolymer as will preserve compatibility, high glass transition temperature and adequate tensile strength.

Certain relatively polar, ethylenically-unsaturated monomers may optionally be copolymerized with the acrylamide and the styrene-type monomer. Exemplary thereof are the nitriles, such as acrylonitrile and methacrylonitrile; acrylic and methacrylic acid esters, such as methyl acrylate, methyl methacrylate, cyclohexyl methacrylate, etc.; and ring halogenated aromatic hydrocarbons, such as 2,5-dichlorostyrene, para-, meta-, and ortho-chlorostyrenes, etc. This constituent may constitute as much as 40 percent of the weight of the interpolymer, but the amount thereof will, once again, depend upon the composition and proportion of other interpolymer components as well as the specific polar comonomer employed. Thus, for example, no more than about 25 weight percent (and preferably less than 15 percent) of acrylonitrile should be copolymerized for optimum blending with polyvinyl chloride, whereas methyl methacrylate may advantageously be employed in significantly greater amounts. Of the various polar compounds, acrylonitrile and methyl methacrylate are the preferred comonomers, and mixtures of the polar compounds may be used. With the foregoing information as a guide, the choice of reactants and the amount thereof in the interpolymer will be apparent to those skilled in the art.

The interpolymer employed may also contain a proportion of preformed rubbery polymer which is grafted with the monomeric constituents of the interpolymer by effecting the polymerization thereof in the presence of the rubber. From a practical standpoint, the interpolymers of the invention should contain no more than about 15 percent by weight of the grafted rubber. Exemplary of the various rubbers onto which the polymerizable monomers can be grafted during polymerization in the presence thereof to produce the graft copolymers are diene rubbers, natural rubbers, ethylene-propylene terpolymer rubbers, other rubbery olefin polymers such as ethylene-vinyl acetate and ethylene-octyl acrylate, and other acrylate rubbers, polyisoprene rubbers, and mixtures thereof. It will be appreciated that such rubbers include not only homopolymers for the specifically identified constituents but also interpolymers which may be characterized primarily as the aforementioned rubbers.

The preferred substrates, however, are diene rubbers (including mixtures with diene rubbers), i.e., any rubbery polymer (a polymer having a second order transition temperature not higher than 0° centigrade, preferably not

---

[1] The solubility parameter can be calculated by a consideration of the contribution made by each of the atoms of the subject compound, or it can be determined experimentally by noting the amount of swelling of a cross-linked form of the compound which occurs when it is treated with solutions of known solubility parameters. The former technique is described by J. A. Brydson in the December 1961 issue of the Journal of Plastics, page 107, which refers to the work of P. A. Small reported in the Journal of Applied Chemistry, 1953, vol. 3, page 71. K. C. Baranwal describes a method of the latter type in an article entitled "Cohesive Energy Densities of Elastomers" in Macromol Chem., 1967, vol. 100, page 242.

higher than −20° centigrade, as determined by ASTM Test D-746-52T) of one or more of the conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinylidene aromatic hydrocarbons (e.g., styrene; an aralkyl-styrene, such as the o-, m- and p-methylstyrenes, 2,4-dimethylstyrene, the arethylstyrenes, p-tert-butylstyrene, etc.; an alpha-methylstyrene, alpha - ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene, propylene, etc.); pyridines; and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous substrates are butadiene homopolymer or interpolymer of 90.0 to 95.0 percent by weight butadiene and 5.0 to 10.0 percent by weight of acrylonitrile or styrene.

Optional components

The blends of the present invention can be comprised solely of the vinyl halide polymer and the incorporated interpolymer or graft copolymers thereof. However, significant advantages are often realized when additional components are also included in the blends. If a graft copolymer is not employed, it is particularly desirable to admix an impact modifier with the other two components to further improve the physical properties of the products produced from the blends, such as toughness, even though desirable physical improvements may be obtained simply by blending the interpolymer with the vinyl halide polymer. Although ungrafted polymers may be used as the impact modifier such as chlorinated polyethylene, chlorosulfonated polyethylene and ethylene-vinyl acetate copolymers, generally diene rubber grafts of the ABS (styrene and acrylonitrile grafted upon a rubbbery diene substrate) and MBS (styrene and methyl methacrylate grafted upon a rubbery diene substrate) types are preferable.

Regardless of the source or mode of introduction of the rubbery polymer, the total amount thereof should not exceed 25 percent of the total weight of the blend, and preferably not more than 15 percent. However, in order to obtain desirable impact modification, it is generally necessary to incorporate at least about 3 percent by weight thereof, and preferably at least 5 percent.

Other optional additives may also be included in the blends of the invention, such as fillers, plasticizers, stabilizers, lubricants and processing aids. Such additives may or may not be desirable, depending upon the characteristics of the blend and upon the optimum balance between economy and proporties which can be attained thereby.

Blending techniques

The blends of the present invention may be prepared by any of the conventional processing techniques, and the design of the apparatus used therefor may vary considerably. It is possible to initially blend the components utilizing suitable equipment, such as a Banbury mixer, mill rolls, etc., to form a preliminary blend, which is then divided and utilized as a feedstock for an extruder or other forming apparatus. Alternatively, the blend may be formed directly in an extruder without any preliminary processing, in which case both the interpolymer and the vinyl halide polymer are advantageously introduced as a powder or other particulate form. The conditions of molding or extrusion are generally the same as those which are used for comparable polymers, the processing temperature of the stock normally being in the range of about 150–200° and preferably about 170–200° centigrade for vinyl chloride polymers. However, these factors will depend somewhat upon the components and resultant blend properties, and, for example, higher processing temperatures will normally be used if the vinyl halide polymer is, or includes, a significant amount of, a halogenated vinyl halide.

Exemplary of the efficacy of the present invention are the following specific examples wherein all parts and percentages are on a weight basis unless otherwise specified.

EXAMPLE I

A dry formulation is prepared by admixing about 100 parts of polyvinyl chloride, about two parts of commercial tin stabilizers, about one part of a lubricant and about 25 parts of a compatible modifying interpolymer. The polyvinyl chloride has a glass transition temperature of about 79° centigrade and a solubility parameter of about 9.5. The interpolymer is prepared by copolymerizing about 25 parts of N-t-butyl acrylamide, about 50 parts of alpha-methyl styrene and about 25 parts of acrylonitrile; it has a glass transition temperature of about 125° centigrade and a solubility parameter of about 10.1. The formulation is then mill rolled at about 150–165° centigrade for about five minutes after fusion occurs, after which the blend is removed from the rolls and allowed to solidify. The solidified blend is ground and compression molded to produce specimens for testing.

The specimens are found to have a glass transition temperature which is more than 10° centigrade higher than that of the polyvinyl chloride from which the blend was prepared. Processability of this material is also much better than that of the polyvinyl chloride, as is seen by a comparison of the melt viscosity of the blend with that of a comparable blend from which the modifying interpolymer is omitted.

EXAMPLE II

Example I is substantially repeated using, however, an interpolymer in which styrene is substituted for the alpha-methyl styrene content thereof. The blend components, other than the interpolymer, are preblended and fused on a mill roll, after which the interpolymer is added; mill rolling is continued for an additional period of about three minutes. Benefits in improved heat distortion and processability are obtained.

EXAMPLE III

Example I is substantially repeated with the substitution of a copolymer produced by copolymerizing about 15 parts of N,N'-diphenyl acrylamide with about 85 parts of methyl methacrylate monomer. Improvements are noted in both the heat resistance and the processing characteristics of the polyvinyl chloride blend prepared utilizing this interpolymer.

EXAMPLE IV

The procedure of Example I is substantially repeated with the subdivision of chlorinated polyvinyl chloride as the vinyl chloride polymer and with an increase in the interpolymer to 67 parts and with a proportionate increase in the amounts of stabilizers and lubricant. The resultant blend has heat resistance properties comparable to those of the chlorinated polyvinyl chloride employed, and the melt viscosity of the blend is much lower than that of chlorinated polyvinyl chloride.

EXAMPLE V

The same formulation as that of Example I is prepared with the addition of about 10 parts of an ABS graft copolymer thereto. As compared to blends of the same polyvinyl chloride from which both the ABS copolymer and the modifying interpolymer are omitted, the glass transition temperature of this blend is equivalent and its toughness is improved significantly. Its glass transition temperature is higher than that of a blend of the vinyl chloride polymer and ABS graft copolymer without the interpolymer and its processability is also improved with respect thereto.

EXAMPLE VI

A blend similar to that of Example I is made, but the interpolymer employed is prepared by polymerizing 30 parts of N-t-butyl acrylamide and 60 parts of methyl methacrylate in the presence of 10 parts of a styrene/1,3-butadiene copolymer (10/90) rubber to graft a portion of the monomers on the rubber. The product is improved in both toughness and glass transition temperature as compared to unmodified polyvinyl chloride.

Thus, it can be seen that the present invention provides novel physical blends of vinyl halide polymers wherein the physical properties and processing characteristics are well balanced. The desirable processing characteristics are most frequently coupled with improved resistance to heat, but in any event processability and/or toughness or other properties may be improved without decrease in heat resistance as compared to the unmodified vinyl halide polymer. When the interpolymer is blended with a high temperature vinyl halide polymer (such as chlorinated polyvinyl chloride), it improves processability while maintaining heat resistance. When it is added to a rubber modified composition, it may counteract the normally depressive effect of a rubbery polymer on the heat resistance of the composition. The blends provided may be readily molded and extruded to form superior products, and in many cases other properties, such as toughness, are enhanced.

What is claimed is:

1. A vinyl halide polymer blend comprising:
  (A) a vinyl halide polymer selected from the group consisting of polyvinyl chloride, vinyl chloride copolymers of vinyl chloride and about 0–15 weight percent thereof of another ethylenically unsaturated copolymerizable monomer, and chlorinated polyvinyl chloride, and
  (B) an interpolymer compatible therewith in a ratio of their respective weights of from about 1.2–20:1, said interpolymer consisting essentially of from about 5–50 weight percent tertiary butyl acrylamide, about 50–90 weight percent of a vinylidene monomer selected from the class consisting of styrene and alpha methyl styrene, and from about 5–25 weight percent of a nitrile monomer selected from the group consisting of acrylonitrile and methacrylonitrile and wherein said interpolymer has a glass transition temperature of about 120° C. and has a solubility parameter within 0.6 unit of that of said vinyl chloride polymer.

2. The blend of claim 1 additionally containing from about 3 to 25 weight percent based on total blend weight of a preformed rubbery polymer comprising styrene and a copolymerizable monomer grafted upon a rubbery diene substrate.

References Cited
UNITED STATES PATENTS

| | | | |
|---|---|---|---|
| 2,491,102 | 12/1949 | Frowde | 260—899X |
| 2,802,809 | 8/1957 | Hayes | 260—876X |
| 2,831,826 | 4/1958 | Coover et al. | 260—899X |
| 3,322,857 | 5/1967 | Coaker et al. | 260—876 |
| 3,322,858 | 5/1967 | Coaker et al. | 260—876 |

FOREIGN PATENTS

| | | | |
|---|---|---|---|
| 722,769 | 11/1965 | Canada | 260—876 |

MURRAY TILLMAN, Primary Examiner

H. ROBERTS, Assistant Examiner

U.S. Cl. X.R.

260—4, 890, 891, 897, 898, 899